United States Patent
Chaumat et al.

(10) Patent No.: US 8,757,475 B2
(45) Date of Patent: Jun. 24, 2014

(54) METHOD FOR THE REFRACTORY ASSEMBLY OF A CARBON MATERIAL AND A COPPER ALLOY

(75) Inventors: Valérie Chaumat, Saint-Paul-de-Varces (FR); Nadia Miloud-Ali, Meylan (FR)

(73) Assignee: Commissariat a l'Energie Atomique, Paris (FR)

( * ) Notice: Subject to any disclaimer, the term of this patent is extended or adjusted under 35 U.S.C. 154(b) by 479 days.

(21) Appl. No.: 12/527,291

(22) PCT Filed: Feb. 14, 2008

(86) PCT No.: PCT/FR2008/000198
§ 371 (c)(1),
(2), (4) Date: Oct. 13, 2009

(87) PCT Pub. No.: WO2008/116989
PCT Pub. Date: Oct. 2, 2008

(65) Prior Publication Data
US 2010/0055478 A1    Mar. 4, 2010

(30) Foreign Application Priority Data
Feb. 16, 2007  (FR) ..................... 07 01156

(51) Int. Cl.
*B23K 31/02*  (2006.01)
(52) U.S. Cl.
USPC .......... 228/233.2; 228/122.1; 228/124.5; 228/233.1
(58) Field of Classification Search
USPC ............ 228/233.2, 122.1, 124.5, 233.1
See application file for complete search history.

(56) References Cited

U.S. PATENT DOCUMENTS

| 5,160,090 A | 11/1992 | Friedrich et al. |
| 5,340,658 A | 8/1994 | Komatsu et al. |
| 5,836,505 A * | 11/1998 | Chaumat et al. .............. 228/121 |

FOREIGN PATENT DOCUMENTS

| FR | 2 835 457 A1 | 8/2003 |
| JP | 06 263553 A | 9/1994 |
| JP | 06 277849 A | 10/1994 |

OTHER PUBLICATIONS

International Search Report from International Patent Application No. PCT/FR2008/000198, filed Feb. 14, 2008.
Landry K; Rado C.; Voitovich R.; Eustathopoulos N.; "Mechanisms of Reactive Wetting: The Question of Triple Line Configuration"; Acta Materialia; vol. 45, No. 7, 1997; pp. 3079-3085; XP008084631.
Database WPI Week 199439; Thomson Scientific, London, GB; AN 1994-314621; XP002454493.

* cited by examiner

*Primary Examiner* — Nicholas P D'Aniello
(74) *Attorney, Agent, or Firm* — Alston & Bird LLP

(57) ABSTRACT

The invention relates to a method for assembling at least one part made of a porous carbon material with at least one part made of a copper-rich metal material, and to an alloy paste used to implement same. The method according to the invention includes a step comprising the use of an alloy based on copper and silicon, having formula I $Cu_xSi_y$, wherein x and y are atomic percentages with $25 \leq x \leq 60$, $40 \leq y \leq 75$ and $x+y \geq 95\%$, in order to assemble at least one part made of a porous carbon material with at least one part made of a copper-rich metal material. The invention is particularly suitable for use in the field of thermal engineering.

5 Claims, No Drawings

METHOD FOR THE REFRACTORY ASSEMBLY OF A CARBON MATERIAL AND A COPPER ALLOY

CROSS REFERENCE TO RELATED APPLICATIONS

This application is a national stage application filed under 35 U.S.C. 371 of International Application No. PCT/FR2008/000198, filed Feb. 14, 2008, which claims priority from French application Ser. No. 07/01156, filed Feb. 16, 2007.

FIELD AND BACKGROUND OF THE INVENTION

The invention relates to a method of assembling at least one part made of a porous carbon-based material with at least one part made of a copper-rich metallic material, and to an alloy paste for implementing this method.

The assemblies, called refractory assemblies, are assemblies of parts having a use temperature greater than 500° C.

These assemblies are of great interest in the field of thermal engineering. They may be used in the manufacture of heat exchanger components, as they have a high energy exchange density of between 10 MW/m$^2$ and 20 MW/m$^2$. The energy is produced with a very high power on the "carbon-based material side" (which is highly refractory), whereas the heat is recovered on the "copper side" (which is less refractory) by an active cooling system, for example cooling by circulating a coolant.

It is therefore important for this type of assembly to ensure both very good heat exchange and very good mechanical anchoring between the various parts that constitute it.

These assemblies are generally assemblies comprising a part made of a copper-rich material with a part made of a porous carbon-based material.

In the present invention, the term "porous carbon-based material" is understood to mean a material comprising at least 50 wt % carbon, preferably greater than 80 wt % carbon, and most preferably composed of 100% carbon.

This type of material may be graphite, glassy carbon, a composite consisting of carbon fibers in a carbon-based matrix, etc.

Likewise, the expression "copper-rich metallic material" is understood, within the present invention, to mean a material comprising at least 50 wt % copper, preferably a material comprising more than 80 wt % copper, and more preferably pure copper.

Finally, the term "porous material" is understood to mean a material having an open porosity greater than 5% and less than 50% by volume of the material in question.

To produce this type of assembly, methods of assembly have been proposed in which the two parts are bonded together using an organic adhesive. However, the use temperatures of these types of assemblies could never exceed at most 200° C., this being inappropriate for refractory assemblies.

It has also been proposed to produce assemblies by purely mechanical methods, by stapling, screwing, interlocking or riveting. However, these assemblies provide only partial and random contact between the two parts, hence very mediocre heat transfer.

It has also been proposed to assemble the two parts of the refractory assembly by fusion welding, i.e. by applying, at high temperature, pressure at the interfaces between the two parts so as to allow atomic interdiffusion between the two parts. In this method, the temperature must always remain below the melting point of the least refractory material. There is therefore no liquid phase in this system. This type of assembly is carried out either in a press, pressing in a single direction, or in an isostatic chamber. Fusion welding is well suited for assemblies between two metal alloys, but rather unsuitable when there is a refractory ceramic material since the constituent atoms of the ceramic diffuse very little at the joint. However, diffusion welding does not allow partial metal infiltration into the porosity of the ceramic material and therefore it is not possible to obtain both very good heat exchange and very good mechanical anchoring between the two parts.

Thus, to guarantee good heat transfer and good mechanical integrity within the assembly, only methods using a liquid phase, which can partially infiltrate the part made of porous carbon-based compound at the interface, may be envisioned.

For this purpose, several methods use reactive brazing which, in all cases, requires brazing, i.e. melting of the braze shielded from the oxygen in the air, and therefore either in a high vacuum of less than 10$^{-4}$ mbar or in an inert gas, argon, etc.

Thus, U.S. Pat. No. 5,340,658 proposes to use a brazing alloy consisting of 86 to 99.5% by weight of at least one reactive element, selected from copper, silver, nickel and aluminum, and 0.5 to 10% by weight of an element chosen from vanadium, niobium, titanium, zirconium and silicon as brazing alloy, so as to join a carbon-based compound to a metallic material. In this method, the brazing alloy is placed at the interface between the part made of carbon composite and the part made of metallic material, and the whole assembly is heated in a vacuum at a temperature of between 850° C. and 980° C. for 10 minutes.

It has also been proposed to use brazes called reactive brazes based on silver or copper, which contain such a percentage of reactive elements, such as titanium or zirconium, thereby ensuring good wetting of most ceramic substrates, especially carbon-based ceramics, such as graphite or carbon-carbon composites.

However, the main drawback of reactive brazing is the randomness of the infiltration, which depends in fact on the randomness of the porosity of the carbon-based material. In other words, it is common to observe, at a single interface, zones in which there is strong infiltration of the compound by the braze, which may result in vacancies at the joints, alongside zones which are impregnated too slightly. In this case, the heat transfer will remain mediocre with the possibility of "hot spots" appearing during operation. Equally, the mechanical fastening will be mediocre with the risk of the carbon-based compound debonding from or being torn off its support in the case of a thermal shock.

As a consequence, this fastening, even if it may give useful results, is lacking in reliability for envisaging an industrial application.

To improve this method, U.S. Pat. No. 5,160,090 proposes to machine the surface of the infiltrated porous material so as to artificially increase the area for carbon-based material/braze exchange. This is carried out by laser machining, making regular perforations with conical holes 50 μm to 500 μm in diameter, with a depth of between 100 μm and 2 mm and a space of 0.25 mm between the perforations. This array of perforations makes it possible to ensure that the infiltration of the reactive braze is distributed very homogeneously. The brazes proposed are generally based on silver and copper, these being activated by a few percent of titanium. Although the proposed mechanical surface treatment does solve the problem of reliability of the reactive braze, its use on a large scale still remains problematic because of the cost and implementation time of this operation, despite it being automated.

Moreover, the document "Mechanisms of reactive wetting: the question of triple line configuration", Acta Mater. Vol. 45, No. 7, p. 3079-3085, 1997, studies the reactive wetting of alloys consisting of 40 at % silicon and 60 at % copper on a glassy carbon substrate or a silicon carbide substrate. This article shows that the wetting with the Cu—Si system on a glassy carbon substrate is good.

However, the wetting alone does not guarantee homogeneous infiltration of the porous substrate, nor good mechanical integrity of a carbon/Cu—Si/copper alloy joint. This is because, for example, excessively good wetting of the braze runs the risk of promoting its complete absorption by the porous carbon-based substrate, which would make subsequent assembly with the copper alloy impossible. Moreover, there is no information about the possible infiltration of the glassy carbon substrate and there is in fact no assembly of a part made of a porous carbon-based material with a part made of a copper-rich metallic material.

The invention aims to alleviate the drawbacks of the methods in the prior art by proposing to use a copper alloy for assembling at least two parts by a method which is industrially applicable while being reliable and inexpensive.

SUMMARY OF THE INVENTION

For this purpose, the invention proposes in particular to use a brazing alloy which will partially infiltrate, in the liquid phase, into the porous carbon-based material, ensuring both mechanical anchoring and good heat transfer in the final assembly obtained.

The brazing alloy used in the invention contains 25 to 60 at % silicon and 75 to 40 at % copper, which corresponds to about 12.8 to 39.9 wt % Si and 87.2 to 60.1 wt % Cu, the sum of the atomic percentages of Si and Cu being equal to at least 95%.

If small amounts of silicon are used, the wetting is very poor, this being unsatisfactory from the brazing standpoint. The reason for this is that poor wetting leads to poor filling of the brazed joint by the braze, or to holes in the joint. Good wetting is not a sufficient criterion for successful brazing, but it is necessary.

On the other hand, if silicon content in the brazing alloy is more than 40 wt %, then infiltration of the porous carbon-based compound is less well controlled and of inferior quality.

One particularly preferred brazing alloy for use in the invention is a brazing alloy containing 40 at % silicon and 60 at % copper.

This alloy is particularly suitable for assembling a part made of a porous carbon-based material with a part made of a copper-rich material.

The brazing alloys used in the invention provide good wetting of a part made of porous carbon-based material but, above all, they make it possible to achieve homogeneous infiltration, controlled so as to be partial, of the brazing alloy into the porous carbon-based compound since, surprisingly, despite the good wettability of silicon-rich systems on carbon, the infiltration of the brazing alloys of the invention into the porous carbon-based material remains slow, thereby making it possible for the penetration of the brazing alloy into the porous carbon-based substrate to be perfectly controlled.

This perfect control of the infiltration of the brazing alloy prevents complete consumption of the brazing alloy by the carbon-based substrate in its pores and ensures that some of the brazing alloy forms a coating on the surface of the porous carbon-based material.

This is because it is possible, after this brazing alloy has melted on the porous carbon-based material, to maintain a thickness of 100 µm of brazing alloy on the surface of the porous carbon-based material, which may thus be used subsequently for carrying out the actual assembly with the copper-rich metallic material.

In addition, surprisingly, moderate reactivity of the brazing alloy with the carbon at the infiltration of the porous carbon-based material has been observed since the zones are very thin, in most cases less than 1 µm. However, the Cu—Si system is known for its reactivity: silicon reacts with carbon for synthesizing silicon carbide. For example, in the case of a carbon-carbon composite incorporating carbon fibers, the integrity of the fibers is maintained in the infiltration zones: there is contact between the brazing alloy and the carbon, but the carbon fibers are not attacked or damaged by the brazing alloy.

The brazing alloy used in the invention may be prepared by melting copper and silicon in the desired atomic proportions in an alumina crucible. The mixture is melted in a furnace under a vacuum of between $10^{-2}$ and $10^{-5}$ mbar or an inert gas for a time of between 10 and 30 minutes, at a temperature of between 1000° C. and 1200° C. After the molten product obtained has cooled down, the cooled product is preferably ground.

Good results when using the brazing alloy of the invention were obtained when the particle size of the brazing alloy powder is between 100 µm and 500 µm.

For more practical and uniform application on the part to be assembled, this powder may be mixed with an organic binder so as to obtain a brazing paste according to the invention, of viscous consistency enabling it to be spread. Suitable binders are known to those skilled in the art. One example of such a binder is Nicrobraz Cement® 650 in an amount of 10 to 20% by volume.

The brazing alloy of the invention may also be obtained from a blend of a silicon powder having a purity of about 98% with a commercial Cu—Si alloy having a purity of about 98%, by blending the commercial Cu—Si alloy with the necessary amount of silicon powder for obtaining the desired Cu and Si atomic proportions. It will be recalled here that these proportions are 25 to 60 at % silicon and 75 to 40 at % copper.

In the same way as previously, this blend is then melted in a furnace under vacuum or in an inert gas at the same temperatures and for the same time as previously.

After the molten product obtained has cooled down, said cooled product may also be ground and then blended with an organic binder so as to obtain a paste of viscous consistency enabling it to be spread onto the surface of the part to be assembled.

The method of assembling at least one part made of a porous carbon-based material with at least one part made of a copper-rich metallic material includes at least one step of using the metallization alloy of the invention.

More precisely, the brazing alloy of the invention is applied, either in powder form or in paste form, to the surface of the part made of a porous carbon-based material to be assembled, which material is degassed beforehand at a temperature of between 1300 and 1400° C. in a high vacuum. Preferably, the assembly surface is coated with an amount of alloy of between 50 and 500 mg per $cm^2$, most preferably with an amount of alloy of between 100 and 400 mg per $cm^2$. The brazing alloy of the invention is then made to melt and infiltrate into the porous carbon-based material. To do this, the part made of a porous carbon-based material, coated on the assembly face with the brazing alloy of the invention or with the brazing paste of the invention, is placed in a vacuum furnace and heated at a temperature enabling the brazing alloy of the invention to melt.

Such a temperature is generally between 1000° C. and 1200° C. The duration of the heat treatment for melting this alloy is between 30 and 90 minutes. The vacuum used is a high vacuum of between $10^{-2}$ and $10^{-5}$ mbar. However, a stream of inert gas, such as argon with an oxygen content of less than 5 ppm, may be used.

Surprisingly, after this operation, the brazing alloy has infiltrated homogeneously, in a perfectly controlled manner, over the entire assembly surface of the part made of a porous carbon-based material. The observed infiltration into the porous carbon-based substrate has a depth of between 500 μm and 1000 μm, depending on the temperature and the duration of the heat treatment, with, on the surface, a film of brazing alloy having a thickness of between 100 and 2000 μm, depending on the temperature and the duration of the heat treatment.

The next step of the method of the invention therefore consists in carrying out the actual assembly between the part made of a porous carbon-based material, the assembly face of which is covered with the molten brazing alloy, and the part made of a copper-rich metal alloy. To do this, that surface of the part made of porous carbon-based material which is coated with the brazing alloy is, after being lightly polished, brought into contact with the assembly surface of the part made of a copper-rich metallic material. The whole assembly is then heated, in a vacuum or in an inert gas, at a temperature which must be below the melting point of the copper-rich metallic material and below the temperature for complete melting of the brazing alloy. However, this temperature must be above 802° C., i.e. the lowest eutectic temperature in the copper-silicon binary composition diagram so that a liquid phase can appear transiently between the metal and the metallized surface of the carbon-based compound at the point of contact. This operation is called "eutectic brazing". The preferred operating parameters for this second thermal cycle are the following: treatment temperature between 850 and 950° C.; and duration of the treatment between 10 and 30 minutes in a high vacuum of between $10^{-2}$ and $10^{-5}$ mbar or in a stream of inert gas such as argon with an oxygen content of less than 5 ppm.

After this second thermal cycle corresponding to the assembling of the two parts, the object is cooled down to room temperature, the assembly then being effective. It is then possible finally to incorporate the assembly produced according to the invention into a heat exchanger, or any other unit, either by mechanical (screwing, riveting) methods or by welding or diffusion welding or brazing.

The assembly obtained according to the invention consists of a part made of a porous carbon-based material and a part made of a copper-rich metallic material having, at the interface joining the parts, a brazing alloy, according to the invention, that has melted. The assembly method of the invention ensures that there is a very good mechanical fastening and very good heat transfer between carbon-based substrates and copper substrates, and consequently very good resistance to thermal shocks, even under extreme conditions.

Another remarkable property of the assembly method of the invention is the homogeneity of the infiltration into the porous carbon-based material despite the initial heterogeneity of the latter. This is because carbon-carbon composites are particularly heterogeneous: arrays of woven carbon fibers randomly release numerous pores. The infiltration obtained with the method of the invention shows that there is the same depth of penetration, whether in a zone having a high density of fibers or, on the contrary, in a zone with a lower density of fibers richer in pores.

In addition, with the method of the invention, the copper infiltration into the porous carbon-based material is achieved without machining the assembly surface, thereby considerably reducing the cost of the assembly operation.

Finally, one of the remarkable advantages of the brazing alloy formulation for "metallizing" the porous carbon-based composite is the fact that the number of chemical elements for carrying out the assembly is greatly limited. This avoids having multi-constituent metallurgical systems that evolve at high temperature and eventually become brittle with the formation of numerous intermetallic compounds. Indeed, in the brazing alloy of the invention, the only chemical elements used are carbon, copper and silicon.

The brazing method and the brazing paste of the invention are particularly applicable in the field of thermal engineering, especially for very high-performance heat exchanger components capable of handling a high heat flux of about 20 $MW/cm^2$. At the points of exchange between the primary circuit and the secondary circuit, it is necessary to use materials suitable for the environments of the two thermal circuits resistant to the use temperatures and having very high thermal conductivity properties, this being the case for carbon-based and copper materials.

Thus, the method and the alloy of the invention are particularly intended for the production of high heat-flux heat exchangers, especially so as to recover energy within a plasma since carbon-based materials are resistant to these extreme conditions. The basic principle of this type of device is to recover the energy released by a plasma obtained by thermonuclear reactions with the aid of a protective shield consisting of panels of carbon-carbon composite tiles. The heat is recovered via the carbon-tile cooling circuit produced using an array of copper tubes. The copper tubular structure must be actively cooled by circulating a coolant so as to keep the temperature of the metal at a reasonable level (<1000° C.). This type of thermal device is very widely used in tokamaks and toroidal plasma confinement devices, these being equipment for studying plasmas and for developing future thermonuclear power stations operating on the nuclear fusion principle.

Thus, the invention also relates to a device comprising at least one assembly according to the invention.

The invention will be better understood and other advantages of the features thereof will become more clearly apparent on reading the following exemplary embodiments given purely as an illustration of the invention but implying no limitation thereof.

EXAMPLE 1

Production of a Carbon-Carbon Composite/Pure Copper Assembly

This example describes the manufacture of an assembly between a C/C composite and a pure copper plate.

The dimensions of the parts were the following:

C/C composite: 20×15×8 $mm^3$;

copper: 20×15×2 $mm^3$.

The C/C composite was a carbon matrix composite reinforced with carbon fibers (supplier: SNECMA; material reference: NB31).

The C/C composite was cleaned in an ultrasonic degreasing (organic solvent) bath and then dried. The composite was then degassed in a vacuum heat treatment at 1420° C. for 1 hour under a vacuum of $10^{-2}$ to $10^{-5}$ mbar.

The copper plate was cleaned in an ultrasonic degreasing bath and then dried.

In a first step, a brazing alloy of 60 at % Cu/40 at % Si composition was manufactured from powders. The alloy was then blended with an organic binder so as to obtain a paste.

In a second step, the face of the C/C composite to be brazed was covered with this brazing paste and the amount of braze preferably between 800 and 1000 mg.

The composite was then placed on a support (an alumina or graphite plate) in a furnace and subjected to a thermal cycle. The heat treatment conditions were:

hold temperature: 1160° C.;
hold duration: 60 minutes;
atmosphere: high vacuum.

After the hold, the cooling was natural cooling.

This treatment resulted in:

melting of the alloy;
infiltration of the alloy into the composite to a depth of about 1.5 mm;
coating of the assembly face of the composite with a continuous alloy thickness (about 500 µm); and
very limited reaction between the carbon and the alloy, namely a reaction zone of ~1 µm.

A third step consisted in brazing the Cu—Si metallized composite with pure copper. That face of the metallized composite to be brazed was lightly polished so as to have perfect contact between the metallization and the copper plate. The metallized face of the composite was then covered with the copper plate without addition of brazing paste. The whole assembly was then placed on a support (an alumina or graphite plate) in a furnace and subjected to a thermal cycle. The heat treatment conditions were:

hold temperature: 900° C.;
hold temperature: 15 minutes;
atmosphere: high vacuum.

After the hold, the cooling was natural cooling. After removal from the furnace, the C/C composite was assembled with the pure copper plate.

EXAMPLE 2

Production of an Assembly Consisting of the Assembly Obtained in Example 1 with a Part Made of a CuCrZr Alloy of 98.97 Wt % Cu/0.84 Wt % Cr/0.14 Wt % Zr Composition The assembly obtained in Example 1 was then assembled with a part made of a CuCrZr alloy.

That face of the CuCrZr part to be assembled with the pure copper was electroplated with nickel. It was then placed facing the pure copper part. The whole assembly was placed in a metal container, under vacuum, which was then sealed off by TIG (tungsten inert gas welding). The sealing of the sealed container was checked using a helium test. Once it was sealed, the container was placed in an HIP (hot isostatic pressing) chamber and subjected to the following heat treatment: temperature: 550° C.; pressure: 400 bar for 120 minutes. After the HIP cycle, the container was opened. What was obtained was an assembly between the CuCrZr and the pure Cu which had itself already been joined to the C—C composite.

EXAMPLE 3

Production of a Carbon-Carbon Composite/CuCrZr Alloy Assembly

This example describes the manufacture of an assembly between a carbon-carbon composite and a plate of a CuCrZr alloy of 98.97 wt % Cu/0.84 wt % Cr/0.14 wt % Zr composition.

The dimensions of the parts were the following:

carbon-carbon composite: 20×15×8 mm$^3$
CuCrZr: 20×15×10 mm$^3$.

The carbon-carbon composite was a carbon matrix composite reinforced with carbon fibers (supplier: SNECMA; material reference: NB31).

The carbon-carbon composite was cleaned in an ultrasonic degreasing (organic solvent) bath and then dried. The composite was then degassed during a vacuum heat treatment at 1420° C. for 1 hour under a vacuum of $10^{-2}$ to $10^{-5}$ mbar.

The CuCrZr plate was cleaned in an ultrasonic degreasing bath and then dried.

In a first step, a brazing alloy of 60 at % Cu/40 at % Si composition was manufactured from powders. The alloy was then blended with an organic binder so as to obtain a paste.

In a second step, that face of the carbon-carbon composite to be brazed was covered with this brazing paste, the amount of braze preferably being between 800 and 1000 mg.

The composite was then placed on a support (an alumina or graphite plate) in a furnace and subjected to a thermal cycle. The heat treatment conditions were:

hold temperature: 1160° C.;
hold time: 60 minutes;
atmosphere: high vacuum.

After the hold, the cooling was natural cooling.

This treatment resulted in:

melting of the alloy;
infiltration of the alloy into the composite over a depth of about 1.5 mm;
coating of the assembly face of the composite with a continuous alloy thickness (about 500 µm); and
very limited reaction between the carbon and the alloy, namely a reaction zone of ~1 µm.

A third step consisted in brazing the Cu—Si metallized composite with the CuCrZr. The face of the metallized composite to be brazed was lightly polished so as to have perfect contact between the metallization and the copper plate. The metallized face of the composite was covered with the CuCrZr plate without addition of brazing paste. The whole assembly was then placed on a support (an alumina or graphite plate) in a furnace and subjected to a thermal cycle. The heat treatment conditions were:

hold temperature: 900° C.;
hold time: 15 minutes;
atmosphere: high vacuum.

After the hold, the cooling was natural cooling. After removal from the furnace, the carbon-carbon composite was assembled with the CuCrZr plate.

EXAMPLE 4

Test of the Resistance to Thermal Shocks of the Assemblies Obtained with the Alloy of the Invention by the Method of the Invention An experimental thermal shock protocol was used for testing the mechanical strength of C/C/Cu—CrCrZr joints produced according to protocols described in Examples 1 and 2.

This protocol consisted in heating the C/C/Cu—CuCrZr assemblies from 20° C. to 450° C. in argon and then in subjecting them to a water quench (the basket, in which the specimens were placed, was released and dropped into water). This treatment was repeated 30 times for each specimen. After 10 cycles, a visual check was made. No rupture of the joints was observed after 30 thermal shocks for 4 identically produced specimens (protocol 1 then protocol 2).

EXAMPLE 5

Production of an Assembly Consisting of the Assembly Obtained in Example 1 with an ODS (Oxide Dispersion Strengthened) Cu Alloy, Said Alloy, Hardened by $Al_2O_3$ Oxide Dispersion, Having a Cu/0.25 Wt % Al/0.2 Wt % O/0.025 wt % B Composition The assembly obtained in Example 1 was then assembled with a part made of an ODS Cu alloy (0.25 wt % Al/0.2 wt % O/0.025 wt % B) having the dimensions 20×15×10 mm³. This part was cleaned in a degreasing bath and then dried.

The face of the pure Cu part, obtained in Example 1, was covered with brazing paste having a 60 at % Cu/40 at % Si composition, the amount of braze being 100 mg. The assembly face of the ODS Cu part was placed on the braze-covered face of the Cu part. The whole assembly was placed on a support (an alumina or graphite plate) in a furnace and subjected to a thermal cycle. The heat treatment conditions were:
hold temperature: 900° C.;
hold time: 15 minutes;
atmosphere: high vacuum.

After the hold, the cooling was natural cooling. Upon removal from the furnace, the ODS Cu part was assembled with the pure Cu part, which had itself already been assembled with the C/C composite, i.e. a C/C—Cu—ODSCu assembly was obtained.

EXAMPLE 6

Production of an Assembly Between a Carbon-Carbon Composite and an ODS Cu Alloy Part, Said Alloy, Hardened by $Al_2O_3$ Oxide Dispersion, Having a Cu/0.25 Wt % Al/0.2 wt % O/0.025 wt % B Composition The dimensions of the parts were the following:
carbon-carbon composite: 20×15×8 mm³;
ODSCu: 20×15×10 mm³.

The carbon-carbon composite was a carbon matrix composite reinforced with carbon fibers (supplier: SNECMA; material reference: NB31).

The carbon-carbon composite part was cleaned in an ultrasonic degreasing (organic solvent) bath and then dried. The carbon-carbon composite part was then degassed by a vacuum heat treatment at 1420° C. for 1 hour under a vacuum of $10^{-2}$ to $10^{-5}$ mbar.

The ODS copper plate was cleaned in an ultrasonic degreasing bath and then dried.

In a first step, a brazing alloy of 60 at % Cu/40 at % Si composition was manufactured from powders. The alloy was then blended with an organic binder so as to obtain a paste.

In a second step, that face of the carbon-carbon composite to be brazed was covered with this brazing paste, the amount of braze preferably being between 100 and 400 mg/cm².

The composite part was then placed on a support (alumina or graphite plate) in a furnace and subjected to a thermal cycle. The heat treatment conditions were:
hold temperature: 1160° C.;
hold time: 60 minutes;
atmosphere: high vacuum.

After the hold, the cooling was natural cooling.

This treatment resulted in:
melting of the brazing alloy;
infiltration of the brazing alloy into the composite to a depth of about 1.5 mm;
coating of the assembly face of the composite with a continuous thickness of brazing alloy (about 500 µm); and
very limited reaction between the carbon and the brazing alloy, namely a reaction zone of ~1 µm.

A third step consisted in assembling the metallized Cu—Si composite part with the ODS copper part. That face of the metallized composite part to be brazed was lightly polished so as to have perfect contact between the metallization (layer of brazing alloy) and the ODS copper plate. The metallized face of the composite was covered with the copper plate without addition of brazing paste. The whole assembly was then placed on a support (alumina or graphite plate) in a furnace and subjected to a heat cycle. The heat treatment conditions were:
hold temperature: 900° C.;
hold time: 15 minutes;
atmosphere: high vacuum.

After the hold, the cooling was natural cooling. Upon removal from the furnace, the carbon-carbon composite part was assembled with the ODS copper plate.

EXAMPLE 7

Thermal Shock Resistance Test

The same protocol as that described in Example 4 was carried out on the assemblies produced in Examples 3, 5 and 6. No rupture was observed after this test.

Although the method, the use of the brazing alloy and the use of the brazing paste of the invention have been described in the above examples as particularly appropriate for assembling a part made of a porous carbon-based material with a part made of a copper-rich material, the invention is in no way limited to assembling such parts.

The invention claimed is:
1. A method of assembling at least one part made of a porous carbon-based material with at least one part made of a copper-rich metallic material, comprising the following steps:
a) deposition of an alloy based on copper and silicon having the following formula:

$$Cu_xSi_y$$

in which x and y are atomic percentages where x is 60 and y is 40, or on the assembly surface of the at least one part made of a porous carbon-based material, so as to have an amount of brazing alloy of between 50 and 500 mg/cm²;

b) heating of the whole assembly obtained in step a), in a vacuum or in an inert atmosphere, so as to melt said alloy or said paste;

c) contacting of the whole assembly obtained in step b) with the assembly surface of said at least one part made of a copper-rich metallic material; and d) heating of the whole assembly obtained in step c) at a temperature below the melting point of said at least one part made of a copper-rich metallic material and below the melting point of said alloy or of said paste, in a vacuum or in an inert atmosphere.

2. The assembly method as claimed in claim 1, wherein the heating temperature of step d) is greater than 802° C.

3. The assembly method as claimed in claim 2, wherein step c) is carried out at a temperature between 1000 and 1200° C. for 30 to 90 minutes, in a vacuum or in an argon atmosphere, and step d) is carried out at a temperature of between 850 and 950° C. for 10 to 30 minutes, in a high vacuum or in a stream of argon.

4. The assembly method as claimed in claim 1, wherein the alloy based on copper and silicon is formed by melting copper and silicon in a furnace under a vacuum and at a temperature between 1000 and 1200° C. to obtain a molten mixture; cooling the mixture; and grinding the cooled mixture to form a powder.

5. The assembly method as claimed in claim 4, further comprising the step of adding an organic binder to the powder to form a paste.

\* \* \* \* \*